United States Patent [19]

Finkelman

[11] 4,059,870
[45] Nov. 29, 1977

[54] OYSTER BOARD

[75] Inventor: Morris Finkelman, Montreal, Canada

[73] Assignee: Amcar Industries, Ltd., Canada

[21] Appl. No.: 718,819

[22] Filed: Aug. 30, 1976

[51] Int. Cl.² .............................................. A22C 29/04
[52] U.S. Cl. ............................................ 17/75; 17/74
[58] Field of Search ................... 17/66, 69, 74, 75, 76; 30/120.1; 99/568

[56] References Cited

U.S. PATENT DOCUMENTS

| 299,756 | 6/1884 | Drake | 17/75 |
| 545,329 | 8/1895 | Zucchini | 17/76 |
| 1,857,872 | 5/1932 | Robinson | 17/76 |
| 2,895,139 | 7/1959 | Compton | 17/66 |

FOREIGN PATENT DOCUMENTS

| 10,376 | 1/1934 | Australia | 17/74 |
| 1,251,654 | 12/1960 | France | 17/75 |
| 2,098,998 | 3/1972 | France | 17/75 |
| 29,833 | 2/1918 | Norway | 17/74 |

Primary Examiner—Russell R. Kinsey
Assistant Examiner—Paul J. Hirsch
Attorney, Agent, or Firm—Diller, Brown, Ramik & Wight

[57] ABSTRACT

A device particularly for use in the home or by customers in restaurants, which facilitates the opening of clams or oysters. Known machines for opening oysters are of much too complicated construction to be of any practical value for use in the home or by customers in restaurants. This drawback is overcome by providing an oyster board which facilitates the opening of clams or oysters. The board is of simple construction in order to permit its use by adults and children alike. The improved oyster board comprises a base with a rear wall extending upwardly from the base. The base includes a receiving depression in the upper surface thereof, the depression being situated in the base adjacent at least one longitudinal groove in the rear wall. The at least one groove is situated adjacent the upper surface of the base, and is thereby adapted to receive an edge portion of an oyster or clam therein. The base has a leg portion extending downwardly therefrom, the leg portion adapted to engage an edge of a surface on which the board is placed during use, so as to retain the board in position when in use. A flexible grip is provided for manually holding the oyster or clam in the depression during opening thereof with an oyster knife. The grip has a curved upper surface which spans the width of the depression, with opposite edges of the curved upper surface resting on the upper surface of the base. The grip is sufficiently flexible as to be brought into engagement with an upper part of the oyster shell when pressure is applied to the grip by one's hand. The grip includes means to protect one's hand from accidental cutting from the oyster knife when opening the oyster or clam.

2 Claims, 5 Drawing Figures

OYSTER BOARD

BACKGROUND OF THE INVENTION

1. Field of the Invention

The present invention relates to a device, particularly for use in the home or by customers in restaurants, which facilitates the opening of oysters or clams, the device to be used in combination with a conventional oyster knife.

2. Description of the Prior Art

Oyster opening machines have been known for more than 80 years, as illustrated in U.S. Pat. No. 545,329 to Zucchini. However, despite the existence of such known machines the same are not used by the public to-day for opening oysters. Rather, it is common practice to open oyster utilizing an oyster knife by gripping the oyster with one's hand and cutting around the periphery of the opening between upper and lower shell portions of the oyster, subsequently inserting the knife between the shell portions, and prying the shells apart. This common method of opening oysters can be dangerous due to the tendency of the oyster to slip when being held in position on a table or counter with one's hand, whereby one can easily cut their fingers or hands. Additionally, it is not uncommon when opening oysters by hand in this manner to scratch the surface of the table or counter with either the oyster or the oyster knife.

While the oyster machine described in the Zucchini patent overcomes these drawbacks, the construction of the machine is much too complicated to be of practical value. In particular, the machine would be quite expensive to manufacture, particularly as a device for opening oysters or clams in the home or for use by customers in restaurants. Additionally, use of the machine presumes that the oyster is within particular size limits in order to extend beyond the guillotine described in the patent, and could therefore not be used for opening both large and small oysters. Further, the end of the oyster shell which would be positioned beneath the plunger or guillotine is quite brittle, such that pieces of the shell would be broken and would fall into the oyster as the end of the oyster is being removed. As a result, the Zucchini oyster machine does not provide a practical alternative to opening oysters by hand.

The present invention proposes to provide an oyster board to facilitate the opening of clams or oysters, the oyster board being of simple construction in order to permit its use by children and adults alike. The oyster board can be manufactured easily and inexpensively and can be used for opening oysters and clams of all sizes, without limitation. As a result, the present invention provides a versatile device which can be used in the home or by customers in restaurants without risk of accidentally cutting one's fingers or hands with the oyster knife.

SUMMARY OF THE INVENTION

According to the present invention, the improved oyster board comprises a base with a rear wall extending upwardly from the base. The base includes a receiving depression in the upper surface thereof, the depression being situated in the base adjacent at least one longitudinal groove in the rear wall. The at least one groove is situated adjacent the upper surface of the base, and is thereby adapted to receive an edge portion of an oyster or clam therein. The base has a leg portion extending downwardly therefrom, the leg porion adapted to engage an edge of a surface on which the board is placed during use, so as to retain the board in position when in use. A flexible grip is provided for manually holding the oyster or clam in the depression during opening thereof with an oyster knife. The grip has a curved upper surface which spans the width of the depression, with opposite edges of the curved upper surface resting on the upper surface of the base. The grip is sufficiently flexible as to be brought into engagement with an upper part of the oyster shell when pressure is applied to the grip by one's hand. The grip includes means to protect one's hand from accidental cutting from the oyster knife when opening the oyster or clam.

BRIEF DESCRIPTION OF THE DRAWINGS

In the drawings which illustrate one embodiment of the present invention.

DESCRIPTION OF THE PREFERRED EMBODIMENTS

Figure 1:
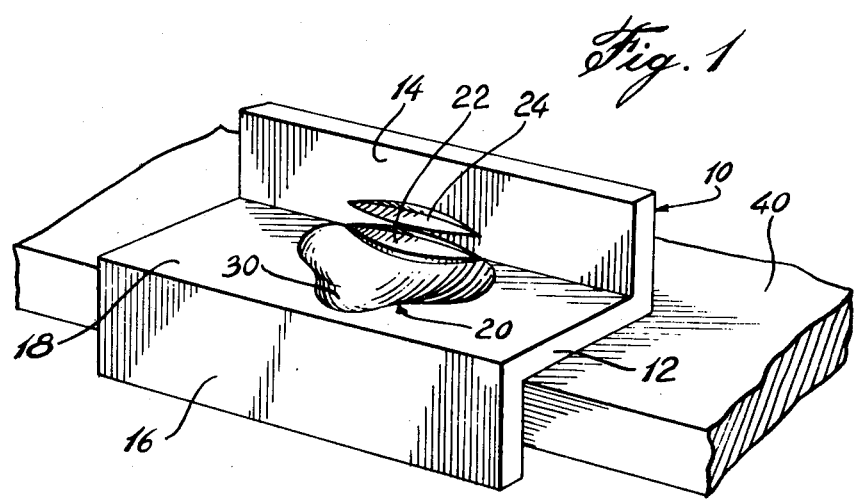
FIG. 1 is a perspective view of one embodiment of the oyster board mounted on the edge of a table or counter.
Figure 2:
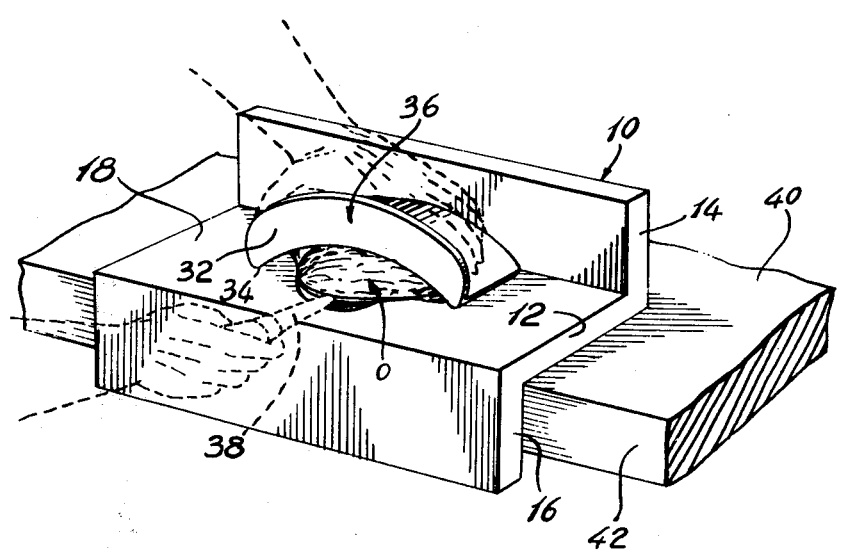
FIG. 2 is a perspective view of the oyster board illustrated in FIG. 1, being used for opening an oyster.
Figure 3:
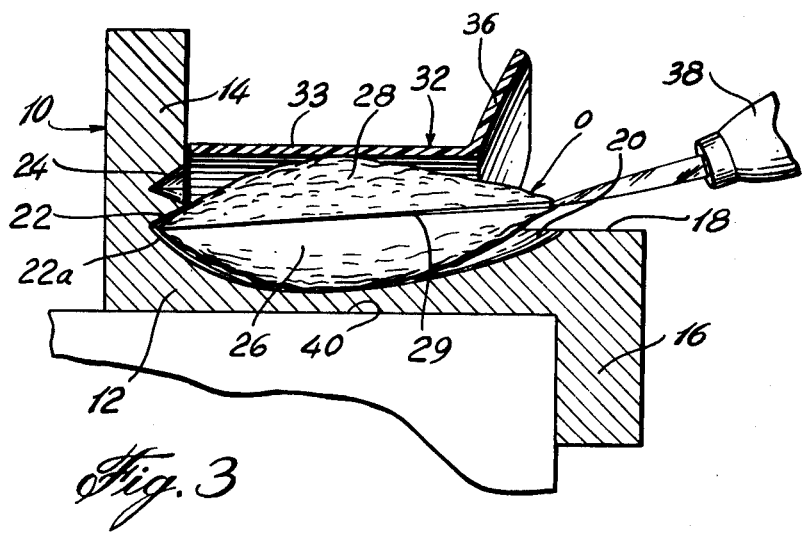
FIG. 3 which appears on the first page of the drawings, is an enlarged vertical transverse cross-section taken through the centre of the oyster board during use.

In the drawings, the oyster board according to the present invention is indicated generally by reference numeral 10, the oyster board 10 including a base portion 12 having a rear wall 14 extending upwardly from a rear end of the base portion 12, and having a leg portion 16 extending downwardly from a forward end of the base portion 12. Both the rear wall and the leg portion 16 extend at right angles to the base portion 12.

An upper surface 18 of the base portion 12 includes a receiving depression 20 extending forwardly along the upper surface of the base portion 12 from the front surface of the rear wall 14. The rear wall includes two spaced-apart longitudinally extending grooves, including a lower groove 22 and an upper groove 24, the grooves being substantially V-shaped in cross-section and extending almost the length of the depression 20. The centre of the lower groove 22 is situated adjacent the level of the upper surface 18 of the base portion 12, with a lower edge 22a of the groove 22 merging into a rear portion of the depression 20. Both lower and upper grooves 22 and 24 are V-shaped so as to receive an edge of the oyster shell therein and to retain the edge of the oyster shell during opening thereof with a conventional oyster knife. The contour of the receiving depression 20 is such as to conform with the shape of the lower shell 26 of an oyster or clam O, while the juncture 29 between the lower shell 26 and an upper shell 28 of the oyster is situated above the upper surface 18 of the base portion 12, thereby facilitating insertion of the blade of the oyster knife between the shells 26 and 28 of the oyster or clam O.

Figure 4:
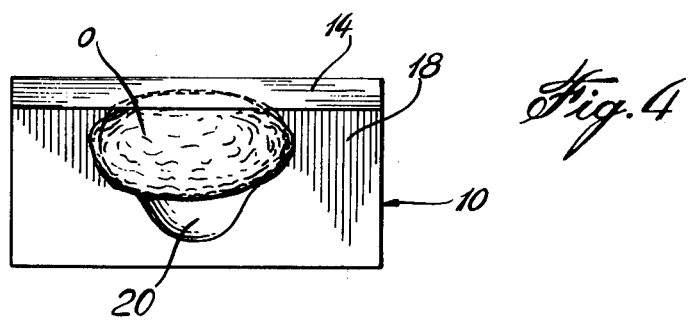
FIG. 4 is a top plan view of the oyster board, illustrating one position of an oyster situated in the receiving depression of the board.
Figure 5:
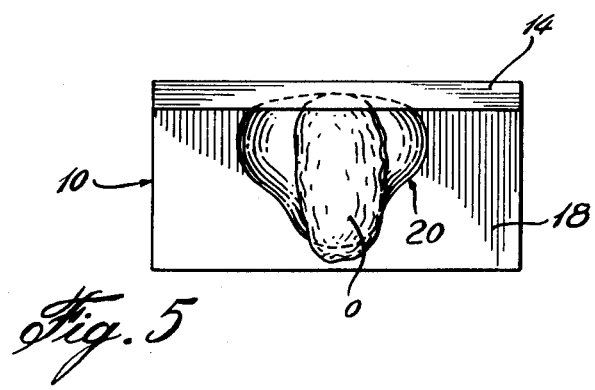
FIG. 5 is a top plan view similar to FIG. 4, illustrating an oyster in an alternative position when mounted on the oyster board.

The lower groove 22 is adapted to receive a portion of the edge of a smaller oyster situated within the receiving depression 20, while the upper groove 24 receives a portion of the edge of a larger oyster situated within the receiving depression 20. Further, the oyster or clam O may be positioned in the depression 22 such that the larger dimension of the oyster extends in the direction of the length of the base portion 12, as best seen in FIG. 4. Alternatively, the oyster may be situated in the receiving depression 20, such that the longer dimension of the oyster extends the width of the base portion 12, as seen in FIG. 5. For this reason, the receiving depression 20 has an appropriate configuration so as to receiving the oyster in either of the positions indicated. Thus, the depession 20 has an outwardly extending bulge portion 30 extending forwardly from the generally oval configuration of the oyster receiving depression 20. When opening an oyster or clam, a grip 32 is held in position above the oyster, the grip 32 being fabricated from a flexible material, such as plastic, to permit a user's hand to press the grip 32 downwardly and into engagement with the upper shell 28 of the oyster. The grip 32 has a curved upper surface 33, opposite end edge 34 of which rest on the upper surface 18 of the base portion 12, on either side of the receiving depression 20. The curved upper surface 33 has a front flange 36 extending upwardly and forwardly therefrom and being of a height sufficient to deflect the cutting edge of the oyster knife 38 away from a user's hand, should the blade of the knife accidently slip when in use.

Opening of the clam or oyster O is effected by inserting the blade of the oyster knife 38 into the juncture 29 between the upper and lower shells 26 and 28 of the clam or oyster O while applying pressure to the grip 32 with the other hand so as to hold the clam or oyster in position in the receiving depression 20. By twisting the oyster knife, the upper and lower shells of the clam or oyster are separated, thereby permitting removal of the oyster from its shell. When in use, the oyster board 10 is positioned at the edge of a table or counter 40, with the leg portion 16 extending downwardly such that a rear surface of the leg portion is in engagement with the edge 42 of the table or counter 40. Engagement between the leg portion 16 and the edge 42 of the table or counter 40 prevents slipping of the oyster board 10 relative to the table or counter 40.

The construction and use of the oyster board 10 is extremely simple, such that children and adults alike can easily utilize the same without possible injury to the hands or fingers of the user due to possible slipping of the oyster knife when in use. Further, the simplicity of the oyster board according to the present invention renders the present invention practical in every day use in the home or by customers in a restaurant.

I claim:

1. An improved oyster board comprising a base, a rear wall extending upwardly from the base, a receiving depression in an upper surface of said base, the depression being situated in the base adjacent at least one longitudinal groove in the rear wall, the at least one groove being situated adjacent the upper surface of the base and adapted to receive an edge portion of any oyster or clam shell therein, the base having a leg portion extending downwardly therefrom, the leg portion portion adapted to engage an edge of a surface on which the board is placed so as to retain the board in position on the surface when in use, a flexible grip for manually holding an oyster or clam in the receiving depression during opening thereof with an oyster knife, the grip having a curved upper surface spanning the width of the receiving depression, with opposite edges of the curved upper surface resting on the upper surface of the base, the grip being sufficiently flexible so as to engage an upper part of the oyster shell when pressure is applied to the grip with one's hand, the grip including means to protect one's hand from being accidently cut by the oyster knife when opening the oyster or clam, the means on the grip to protect one's hand comprises a flange extending upwardly and forwardly along a front edge of the upper surface of the grip, the height of the flange being sufficient to protect one's hand placed on the curved upper surface of the grip, the oyster board including two spaced-apart longitudinal V-shaped grooves extending approximately the length of the receiving depression in the rear wall of the oyster board, a lower longitudinal groove adapted to receive an edge portion of a smaller oyster, while the upper longitudinal groove is adapted to receive the edge portion of the shell of a larger oyster positioned within the receiving depression, the receiving depression being concave in configuration and is substantially oval in plan view, with a longer dimension of the oval configuration extending along the length of the upper surface of the base to receive an oyster positioned lengthwise of the base in the receiving depression, the receiving depression also including a forwardly extending bulge from the oval configuration to permit the placing of oysters or clams in the receiving depression placed widthwise of the base, the oyster receiving depression being of a depth such that a juncture between the upper and lower shells of the oyster is situated above the upper surface of the oyster board, thereby providing access to the juncture of the shells by means of the oyster knife.

2. An oyster board according to claim 1, wherein the width of the curved upper surface of the grip terminates short of an outer edge of the receiving depression, whereby a forward edge of the oyster extends outwardly beyond the upwardly extending flange of the grip, thereby providing access to the edge of the shell of the oyster with the oyster knife.

* * * * *